United States Patent
Yan et al.

(10) Patent No.: US 9,712,450 B1
(45) Date of Patent: Jul. 18, 2017

(54) METHODS AND SYSTEMS FOR SCHEDULING DATA TRANSMISSION WITH A FEEDBACK MECHANISM

(71) Applicant: Cisco Technology, Inc., San Jose, CA (US)

(72) Inventors: Anlu Yan, Acton, MA (US); Aimin Ding, Westford, MA (US); Jin Sheng, Northborough, MA (US); Chad Mikkelson, Arlington, MA (US); Atul Rawat, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 136 days.

(21) Appl. No.: 14/495,810

(22) Filed: Sep. 24, 2014

(51) Int. Cl.
*H04L 12/26* (2006.01)
*H04L 12/825* (2013.01)
*H04L 12/819* (2013.01)

(52) U.S. Cl.
CPC .......... *H04L 47/263* (2013.01); *H04L 47/215* (2013.01)

(58) Field of Classification Search
None
See application file for complete search history.

(56) References Cited

U.S. PATENT DOCUMENTS

| | | | |
|---|---|---|---|
| 7,174,499 B1* | 2/2007 | Zogg | H03M 13/3753 714/755 |
| 8,059,546 B2 | 11/2011 | Pai et al. | |
| 8,489,958 B2 | 7/2013 | Chapman et al. | |
| 8,654,640 B2 | 2/2014 | Ulm | |
| 2009/0116489 A1* | 5/2009 | Hanks | H04L 47/10 370/394 |
| 2010/0061235 A1* | 3/2010 | Pai | H04L 12/2801 370/230.1 |
| 2010/0226390 A1 | 9/2010 | Yan et al. | |
| 2012/0039173 A1* | 2/2012 | Danzig | H04L 12/2801 370/235.1 |

* cited by examiner

*Primary Examiner* — Steven H Nguyen
(74) *Attorney, Agent, or Firm* — Ronald Fernando

(57) ABSTRACT

In one embodiment, a method includes identifying one or more channel queues associated with one or more RF channels, wherein the one or more RF channels are associated with a Data Over Cable System Interface Specification (DOCSIS) bonding group and wherein the DOCSIS bonding group receives downstream data from a first node, determining a data usage of the DOCSIS bonding group, determining that a data rate of the downstream data is to be modified based on at least one of the one or more channel queues or the data usage of the DOCSIS bonding group, and causing the first node to modify the data rate of the downstream data based on the determination.

16 Claims, 8 Drawing Sheets

US 9,712,450 B1

METHODS AND SYSTEMS FOR SCHEDULING DATA TRANSMISSION WITH A FEEDBACK MECHANISM

TECHNICAL FIELD

The present disclosure relates generally to the field of networking, and in particular, to methods and system for scheduling the transmission of data.

BACKGROUND

The Data Over Cable Service Interface Specification (DOCSIS) is international telecommunications standard that permits cable television (CATV) systems to accommodate high-speed data. DOCSIS may be employed to provide network access (e.g., to provide access to the Internet) via a hybrid fiber-coaxial (HFC) network and/or infrastructure. An HFC network may be a broadband network that uses both optical fiber and coaxial cable. The HFC network may be a communication network between a cable modem termination system (CMTS) and a network communication device (e.g., a cable modem). Cable operators (e.g., cable companies/providers) may use DOCSIS to deploy high-speed data services on CATV systems that have an HFC infrastructure. The high-speed data services may allow subscriber-side computing devices (e.g., smartphones, tablet computers, laptop computers, desktop computers, netbook computers, etc.) to access public networks, such as the internet, via the HFC infrastructure of the CATV systems.

BRIEF DESCRIPTION OF THE FIGURES

So that the present disclosure can be understood by those of ordinary skill in the art, a more detailed description may be had by reference to aspects of some illustrative implementations, some of which are shown in the accompanying drawings.

Figure 1A:
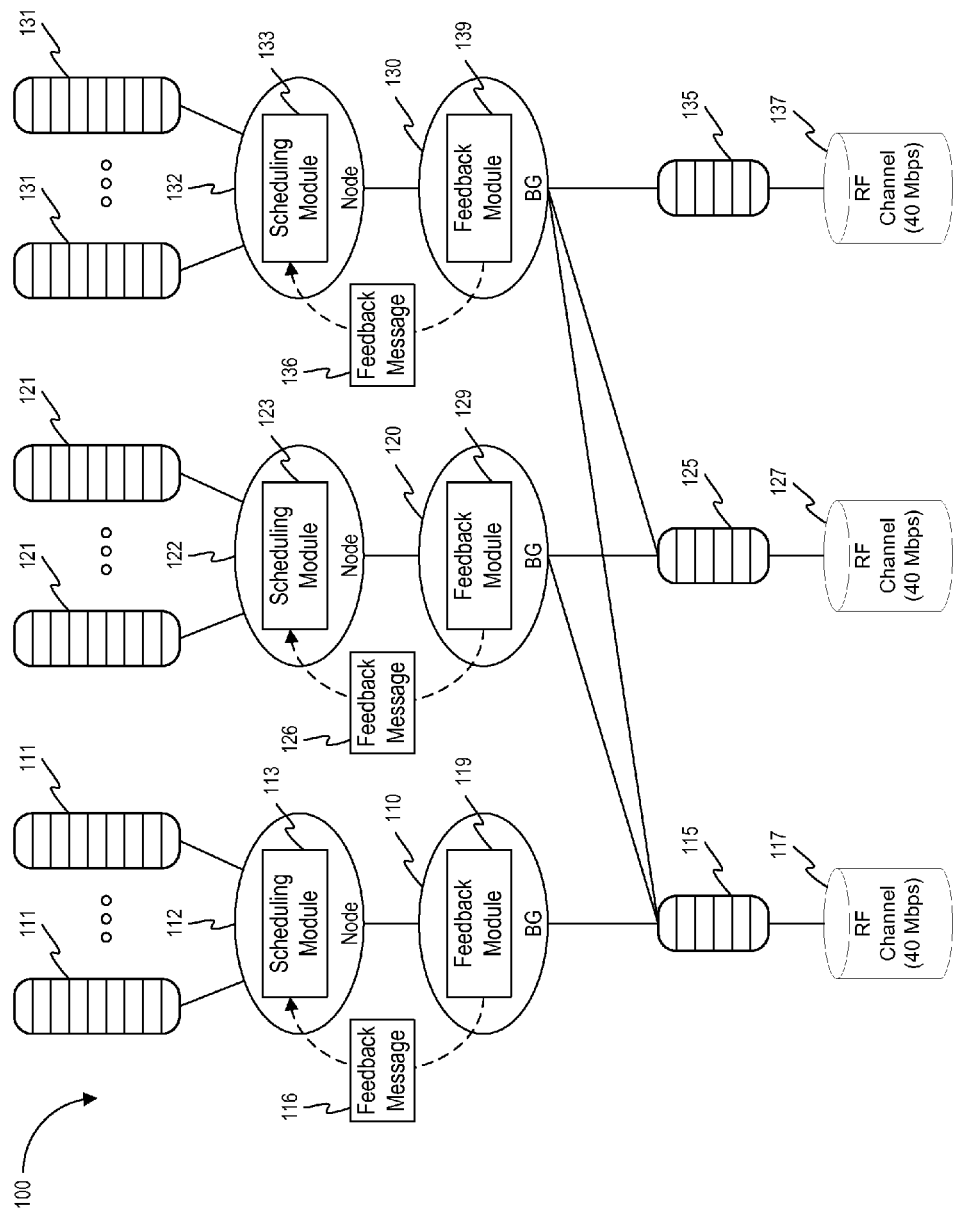
FIG. 1A is a block diagram illustrating an example network, in accordance with some embodiments.

In accordance with common practice various features shown in the drawings may not be drawn to scale, as the dimensions of various features may be arbitrarily expanded or reduced for clarity. Moreover, the drawings may not depict all of the aspects and/or variants of a given system, method or device admitted by the specification. Finally, like reference numerals may be used to denote like features throughout the specification and figures.

DESCRIPTION OF EXAMPLE EMBODIMENTS

Numerous details are described herein in order to provide a thorough understanding of the illustrative implementations shown in the accompanying drawings. However, the accompanying drawings show only some example aspects of the present disclosure and are therefore not to be considered limiting. Those of ordinary skill in the art will appreciate from the present disclosure that other effective aspects and/or variants do not include all of the specific details described herein. Moreover, well-known systems, methods, components, devices and circuits have not been described in exhaustive detail so as not to unnecessarily obscure more pertinent aspects of the implementations described herein.

Overview

Various implementations disclosed herein include apparatuses, systems, and methods for scheduling the transmission of data. For example, in some implementations, a method includes identifying one or more channel queues associated with one or more RF channels, wherein the one or more RF channels are associated with a Data Over Cable System Interface Specification (DOCSIS) bonding group and wherein the DOCSIS bonding group receives downstream data from a first node, determining a data usage of the DOCSIS bonding group (e.g., an expected and/or actual data usage of the DOCSIS bonding group), determining that a data rate of the downstream data is to be modified based on at least one of the one or more channel queues or the data usage of the DOCSIS bonding group, and causing the first node to modify the data rate of the downstream data based on the determination. In additional implementations, computing devices for performing the operations of the described embodiments may also be implemented. In further implementations, a non-transitory computer readable storage medium may store instructions for performing the operations of the embodiments described herein.

DETAILED DESCRIPTION

FIG. 1 is a block diagram illustrating an example network 100, in accordance with some embodiments. The network 100 data queues 111, data queues 121, data queues 131, node 112, node 122, node 132, bonding group (BG) 110, bonding group 120, bonding group 130, channel queue 115, channel queue 125, channel queue 135, RF channel 117, RF channel 127, and RF channel 137. Node 112 includes a scheduling module 113, node 122 includes a scheduling module 123, and node 132 includes a scheduling module 133. Bonding group 110 includes feedback module 119, bonding group 120 includes feedback module 129, and bonding group 130 includes feedback module 139. The feedback modules 119, 129, and 139, and the scheduling modules 113, 123, and 133, may each be processing logic that includes hardware (e.g., circuitry, dedicated logic, programmable logic, microcode, etc.), software (e.g., instructions executed or run on a processor), or a combination thereof. In one embodiment, the nodes 112, 122, and 132, and the bonding groups 110, 120, and 130 may be included in a CMTS.

As discussed above, various networks (e.g., HFC networks used by CATV systems/operators) may use DOCSIS to provide high-speed data services that may allow subscriber-side computing devices to access public networks (e.g., access the Internet, access streaming multimedia, access webpages, access social media, play online games, etc.). The network 100 may use DOCSIS to provide users (e.g., CATV subscriber) with high speed data services. Data (e.g., digital data, bits of data, packets, data packets, messages, etc.) may be modulated onto one or more of RF channels 117, 127, and 137 using various modulation techniques. For example, data may be modulated onto RF channels 117, 127, and 137 using Quadrature Amplitude Modulation (QAM) techniques.

In one embodiment, the network 100 may be an HFC network that may use a DOCSIS feature referred to as "bonding groups" (BGs) or "channel bonding. The network 100 may be a system and/or architecture that allows data to be transmitted and/or received using the HFC network. A bonding group may allow a user (e.g., a CATV system subscriber), a communication device (e.g., a cable modem) and/or a data flow (e.g., streams or flows of data associated with a user, a communication device, an application, a service, etc.) to use multiple RF channels simultaneously (e.g., to use multiple RF channels at the same time). For example, a communication device (e.g., a cable modem) may use multiple RF channels to receive downstream data (e.g., to receive downstream data from the HFC network, etc.). A bonding group may be associated with multiple RF channels and may multiplex data across the multiple RF channels. For example, bonding group 130 may allow a cable modem to use RF channels 117, 127, and 137 to receive downstream data. The bonding group 130 may distribute and/or multiplex downstream data (e.g., bits, data packets, messages, etc.) sent to the cable modem among the RF channels 117, 127, and 137 to transmit data in parallel (rather than in series). A bonding group (e.g., bonding group 110, bonding group 120, and/or bonding group 130) may increase the capacity, throughput, and/or traffic burst capacity (e.g., capacity or ability to handle sudden and/or temporary increases in the amount of downstream data). Bonding groups 110, 120, and/or 130 may also be referred to as DOCSIS bonding groups. DOCSIS bonding groups (BGs) that use one or more RF channels may also be referred to as "bonded channels." For example, bonding groups 120 and 130 may be referred to as bonded channels. DOCSIS single channels may also be referred to as "non-bonded channels." For example, bonding group 110 may be referred to as a "non-bonded channel". The present disclosure may refer to both "bonded channels" and "non-bonded channels" as bonding groups, as the disclosure apply to both. Furthermore, although the present disclosure may refer to DOCSIS and/or bonding groups, the embodiments, examples, and/or implementations described herein may also apply to other communication standards, interfaces, and/or protocols that may allow physical communication channels (e.g., RF channels) to be shared (e.g., multiplexed).

As discussed above, a bonding group may be associated with one or more RF channels. Bonding group 110 is associated with RF channel 117. Bonding group 120 is associated with RF channel 117 and RF channel 127. Bonding group 130 is associated with RF channel 117, RF channel 127, and RF channel 137. The bonding groups 110, 120, and 130 illustrated in FIG. 1 are merely examples of bonding groups. In some embodiments, bonding groups may be associated with any number of RF channels. For example, a bonding group may be associated with two RF channels, five RF channels, sixteen RF channels, thirty-two RF channels, sixty-four RF channels, etc. The associations between bonding groups 110, 120, and 130, and RF channels 117, 127, and 137 may form a meshed hierarchy/topology because the bonding groups may each be associated with different RF channels.

As discussed above, users (e.g., CATV system subscribers), communication devices (e.g., cable modems) and/or data flows (e.g., a service flow) may transmit and/or receive data using the network 100. The users, communication devices, and/or data flows may use the data queues 111, 121, and 131 to transmit data to the network 100. For example, the users, communication devices, and/or data flows may transmit data to the network 100 using the data queues 111, 121, and 131. In one embodiment, the data queues 111, 121, and/or 131 may be associated with various users, communication devices, and/or data flows. For example, there may be one queue per user (e.g., one queue per CATV system subscriber), one queue per data flow from a user (e.g., one queue for a user's video streaming application and another queue for the user's gaming application, etc.), one queue per communication device (e.g., one queue per cable modem), etc. Groups of queues (which may receive data from the users, communication devices, and/or data flows) may be associated with a node (e.g., a network node).

Each node may be associated with a bonding group. For example, node 112 is associated with bonding group 110. Each node may transmit the downstream data in an associated group of data queues to a bonding group. For example, node 112 may transmit the downstream data in data queues 111 to the bonding group 110. In another example, node 132 may transmit the downstream data in data queues 131 to the bonding group 130.

As illustrated in FIG. 1, the node 112 includes scheduling module 113, the node 122 includes scheduling module 123, and the node 132 includes scheduling module 133. Scheduling module 113 may schedule the transmission of downstream data (e.g., digital data, binary data, packets, messages, etc.) in the data queues 111 to bonding group 110. Scheduling module 123 may schedule the transmission of downstream data in the data queues 121 to bonding group 120. Scheduling module 133 may schedule the transmission of downstream data in the data queues 131 to bonding group 130. The scheduling modules 113, 123, and 133 may also be referred to as schedulers and/or packet schedulers. In some embodiments, the scheduling modules 113, 123, and 133 may scalable schedulers that may schedule the transmission of data from any number of queues. For example, a scheduling module may schedule the transmission of data from tens, hundreds, thousands, of even hundreds of thousands of queues. In one embodiment, one or more of the scheduling modules 113, 123, and 133 may be scalable schedulers that may be able to support various features and/or perform various functions such as maintaining a minimum quality of service (QoS), maintaining a minimum or guaranteed data rate (e.g., minimum or guaranteed throughput) between the data queues and the nodes, enforcing bandwidth ratios (e.g., enforcing a percentage or a ratio usage for each data queue), prioritizing different types of data (e.g., priority voice data over other types of data), etc. The scheduling modules 113, 123, and 133 may use various techniques, algorithms, formulas, functions, data structures, etc., to schedule the transmission of data from the data queues 111, 121, and 131 to the bonding groups 110, 120, and 130.

In one embodiment, the scheduling modules 113, 123, and 133 may not be aware of the underlying mesh topology/hierarchy of the bonding groups 110, 120, and 130, and the RF channels 117, 127, and 137. For example, the scheduling module 133 may not be aware that the bonding group 130 is associated with RF channels 117, 127, and 137. In another example, the scheduling module 123 may not be aware that the bonding group 120 is associated with RF channels 117 and 127. In one embodiment, the scheduling modules 113, 123, and 133 may support the use of feedback messages, such as feedback messages 116, 126, and 136, to control the amount of downstream data the scheduling modules 113, 123, and 133 send to the bonding groups 110, 120, and 130. For example, the scheduling module 113 may be configured to receive the feedback message 116 from a feedback module 119 of the bonding group 110 (as discussed in more detail below). A feedback message may include data indicating whether a scheduling module should modify the rate (e.g., the data rate) of downstream data that is provided to an associated bonding group. For example, feedback message 136 may include data indicating that the scheduling module 133 should decrease/increase the rate and/or amount of downstream data that the node 132 is providing to the bonding group 130 (as discussed in more detail below).

As discussed above, each node 112, 122, and 132 provides (e.g., transmits and/or sends) data received from respective data queues 111, 121, and 132 to a respective bonding group 110, 120, and 130. The bonding groups 110, 120, and 130 are associated with the RF channels 117, 127, and 137 (as discussed above). The bonding groups 110, 120, and 130 may use channel queues 115, 125, and 135 to transmit downstream data to the RF channels 117, 127, and 137, respectively. For example, the bonding group 110 may transmit data to the RF channel 117 by adding (e.g., inserting) the downstream data into the channel queue 115. The downstream data in the channel queue 115 may be transmitted via the RF channel 117 on a first-in-first-out (FIFO) basis. In another example, the bonding group 130 may transmit downstream data to the RF channels 117, 127, and 137 by adding the downstream data into the channel queues 115, 125, and 135, respectively. Although FIG. 1A illustrates that RF channels 117, 127, and 137 are each associated with one channel queue (e.g., channel queues 115, 125, and 135, respectively), in other embodiments, each RF channel may be associated with any number of queues. For example, an RF channel may be associated with two channels queues, one for higher priority data and one for lower priority data. In another example, an RF channel may be associated with different channel queues for different types of data (e.g., one channel queue for voice data, one channel queue for streaming video data, etc.).

Each of the bonding groups 110, 120, and 130 may be configured to support a maximum data rate (e.g., maximum throughput) and minimum data rate (e.g., minimum throughput). A minimum data rate may be a data rate (e.g., throughput) for downstream data that a bonding group is generally able to guarantee to an associated node. For example, the node 112 may have a minimum data rate of 20 megabits/second. Thus, the bonding group may be able to guarantee a minimum data rate of 20 megabits/second for downstream data sent to users, computing devices and/or data flows (via the node 112 and the data queues 111). The minimum data rate may also be referred to as a contract data rate, a guaranteed data rate and/or a committed information rate (CIR). A maximum data rate (e.g., throughput) may be a data rate for downstream data that a bonding group should generally not exceed. The maximum data rate for a bonding group may be based on the RF channels that are associated with the bonding group. In one embodiment, the maximum data rate for a bonding group may be the sum of the maximum data rates of the RF channels associated with the bonding group. As illustrated in FIG. 1, RF channels 117, 127, and 137 each have a maximum data rate of 40 megabits/second. Bonding group 110 is associated with RF channel 117 and bonding group 110 may have a maximum data rate of 40 megabits/second. Bonding group 120 is associated with RF channels 117 and 127, and bonding group 120 may have a maximum data rate of 80 megabits/second. Bonding group 130 is associated with RF channels 117, 127, and 137, and bonding group 130 may have a maximum data rate of 120 megabits/second. Configuring a bonding group to have a maximum data rate based on the RF channels associated with the bonding group may allow the bonding group to increase and/or maximize the utilization of the RF channels associated with the bonding group (as discussed in more detail below). It should be understood that each of the bonding groups 110, 120, and 130 may be configured to support different maximum data rates and/or different minimum data rates.

In one embodiment, the feedback modules 119, 129, and 139 may schedule the transmission of downstream data received from respective nodes 112, 122, and 132 by adding the downstream data into the channel queues of RF channels associated with the bonding groups 110, 120, and 130, respectively. For example, the feedback module 119 may schedule the transmission of downstream data received from node 112 by adding (e.g., inserting) the downstream data into the channel queue 115. In another example, the feedback module 139 may schedule the transmission of downstream data received from the node 132 by adding the downstream data into one or more of the channel queues 115, 125, and 135. In one embodiment, the feedback modules 119, 129, and 139 may schedule the transmission of downstream data by determining the length of one or more channel queues associated with a bonding group and inserting the downstream data into the shortest channel queue associated with the bonding group (e.g., the channel queue with the least amount of downstream data in the channel queue). In other embodiments, the feedback modules may use various techniques, algorithms, formulas, functions, data structures, etc., to schedule the transmission of downstream data to the RF channels 117, 127, and 137 via the channel queues 115, 125, and 125.

As discussed above, the scheduling modules 113, 123, and 133 may not be aware of the underlying mesh topology/hierarchy of the bonding groups 110, 120, and 130, and the RF channels 117, 127, and 137. The network 100 may not be able to efficiently use the RF channels 117, 127, and 137 (e.g., may not be able to maximize the data rate and/or throughput of the RF channels 117, 127, and 137) because the scheduling modules 113, 123, and 133 may be unaware of the associations between the bonding groups 110, 120, and 130, and the RF channels 117, 127, and 137 (e.g., the underlying topology/hierarchy). The network 100 may also not be able to reduce the amount of downstream data in accordance with the minimum data rates for the bonding groups 110, 120, and 130 (e.g., in order to help ensure that each bonding group 110, 120, and 130 are able to transmit data at their respective minimum data rates) when the RF channels 117, 127, and 137 are already at their maximum data rates and/or throughputs because the scheduling modules 113, 123, and 133 may be unaware of the associations between the bonding groups 110, 120, and 130, and the RF channels 117, 127, and 137. In one embodiment, the feedback modules 119, 129, and 139 may allow the network 100 to more efficiently use the RF channels 117, 127, and 137 and may allow the scheduling modules 113, 123, and 133 to reduce the amount of downstream data when the RF channels 117, 127, and 137 are already at their maximum data rates and/or throughputs.

The feedback modules 119, 129, and 139 may identify the RF channels that are associated with the respective bonding groups 110, 120, and 130. For example, feedback module 139 may identify and/or determine that the bonding group 130 is associated with RF channels 117, 127, and 137. The feedback modules 119, 129, and 139 may also determine the data usage of the bonding groups 110, 120, and 130 respectively. For example, the feedback module 139 may determine the amount of downstream data (e.g., the data rate and/or throughput) that the feedback module 139 has added to the channel queues 115, 125, and 135. In one embodiment, the feedback modules 119, 129, and 139 may each use a token bucket to determine the data usage of the bonding groups 110, 120, and 130 respectively. The feedback modules 119, 129, and 139 may determine whether the data usage of the respective bonding groups 110, 120, and 130 exceed the minimum data rates for the bonding groups 110, 120, and 130. For example, the feedback module 119 may determine whether the data usage of bonding group 110 exceeds a minimum data rate for the bonding group 110. In one embodiment, the feedback modules 119, 129, and 139 may also determine whether the length of one or more channel queues for RF channels associated with their respective bonding groups 110, 120, and 130 is greater than a threshold length. For example, the feedback module 129 may determine whether the lengths of the channel queues 115 and 125 are greater than a threshold length. In another example, the feedback module 139 may determine whether the length of one or more of channel queues 115, 125, and 135 is greater than a threshold length. In one embodiment, the threshold length for a channel queue may be selected such that the RF channel may transmit at the maximum data rate when the length of the channel queue remains less than or equal to the threshold length. In other embodiments, the threshold length may be any length.

In one embodiment, the feedback modules 119, 129, and 139 may cause the scheduling modules 113, 123, and 133 to modify the data rate of the downstream data transmitted to the bonding groups 110, 120, and 130 (e.g., to decrease/increase the data rate of the downstream data) based on the data usage of the bonding groups 110, 120, and 130, and based on the channel queues 115, 125, and 135. For example, the feedback module 129 may cause the scheduling module 123 to decrease the amount of downstream data provided by the node 122 to the bonding group 120 if all of the lengths of the channel queues 115 and 125 are greater than a threshold length and if the data usage of the bonding group 120 is greater than the minimum data rate of the bonding group 120. The feedback modules 119, 129, and 139 may cause the scheduling modules 113, 123, and 133 to decrease the amount of downstream data by sending feedback messages 116, 126, and 136, respectively. As discussed above, a feedback message may include data indicating whether a scheduling module should modify (e.g., increase or decrease) the rate (e.g., the data rate) and/or the amount of downstream data that is provided to an associated bonding group. For example, feedback message 116 may include data indicating that the node 112 should stop sending downstream data to the bonding group 110. In another example, the feedback message 126 may include data indicating that the node 122 should stop sending downstream data to the bonding group 120. In a further example, the feedback message 136 may include data indicating that the node 132 should resume or continue sending downstream data to the bonding group 130.

In one embodiment, the feedback messages 116, 126, and 136 may indicate that that the nodes 112, 122, and 132 should stop and/or resume (e.g., continue) sending (e.g., transmitting) downstream data to the bonding groups 110, 120, and 130, respectively. In another embodiment, the feedback messages 116, 126, and 136 may indicate that that the nodes 112 122, and 132 should decrease and/or increase the data rate of the downstream data to the bonding group 130, respectively. For example, feedback message 136 may indicate that the node 132 should decrease the rate of the downstream data to the bonding group 130 by twenty percent or by 5 megabits/second. In a further embodiment, the feedback messages 116, 126, and 136 may indicate that that the nodes 112, 122, and 132 should stop, resume, decrease, and/or increase certain types and/or priorities of downstream data to the bonding group 130. For example, voice data (e.g., data for a voice-over-internet-protocol (VoIP) call may be given higher priority than other types of downstream data (e.g., data for streaming videos, data for online video games, etc.). The feedback messages 116, 126, and 136 may indicate that data rate for certain types/priorities of downstream data (e.g., data for streaming videos, data for online video games, etc.) should decreased and/or stopped but that other types/priorities of downstream data (e.g., data for VoIP calls) should not be decreased and/or stopped.

In one embodiment, the network 100 the scheduling modules 113, 123, and 133, and the feedback modules 119, 129, and 139 may operate in conjunction with each other (e.g., may operate together) to schedule the transmission of downstream data from the data queues 111, 121, and 131 to the RF channels 117, 127, and 137. Thus, the network 100 may thought of as scheduling the transmission of downstream data in two stages and/or phases. The scheduling modules 113, 123, and 133 may be referred to as a first stage or phase. As discussed above, the scheduling modules 113, 123, and 133 may schedule the transmission of downstream data from the nodes 112, 122, and 132 to the bonding groups 110, 120, and 130. The bonding groups 110, 120, and 130 may be referred to as a second stage or phase. Also as discussed above, the bonding groups 110, 120, and 130 may schedule the transmission of downstream data received from the nodes 112, 122, and 132 to the RF channels 117, 127, and 137.

In one embodiment, by scheduling the transmission of downstream data in two stages and/or phases, the network 100 may allow the RF channels 117, 127, and/or 137 to be used more efficiently even though the scheduling modules 113, 123, and 133 may not be aware of the associations between the bonding groups 110, 120, and 130 and the RF channels 117, 127, and 137. The feedback modules 119, 129, and 139 may also allow a bonding group to increase and/or maximize the data rates of downstream data when other bonding groups are not transmitting downstream data or have less downstream data to transmit (as discussed further below in conjunction with FIGS. 2 and 3). For example, bonding group 130 may be able to transmit downstream data at a higher data rate than the minimum data rate for the bonding group if bonding groups 110 and 120 are transmitting data at less than their respective minimum data rates (e.g., if bonding groups 110 and 120 are not using their minimum data rates). The feedback messages 116, 126, and 136 allow the feedback modules 119, 129, and 139 to modify (e.g., decrease, stop, increase, resume) the downstream data received from the nodes 112, 122, and 132 to help ensure that each of the bonding groups 110, 120, and 130 is able to transmit downstream data at their respective minimum data rates (as discussed further below in conjunction with FIGS. 2 and 3).

In another embodiment, scheduling the transmission of downstream data in two stages and/or phases may allow for different scheduling modules and/or feedback modules to be used in the network 100. For example, different cable operators may use different scheduling modules. The scheduling modules 113, 123, and 133 may be replaced with different scheduling modules that use different functions, algorithms, etc., to schedule the transmission of downstream packets if the different scheduling modules are configured to receive feedback messages (e.g., messages and/or data indicating whether a scheduling module should decrease, stop, increase, and/or resume the transmission of data). In another example, the different cable operators may use different feedback modules. The feedback modules 119, 129, and 139 may be replaced with feedback modules that use different functions, algorithms, etc., to schedule the transmission of downstream packets if the different feedback modules are configured to determine the data usages of bonding groups, determine the lengths of channel queues, and send feedback messages based on the data usages and/or lengths of the channel queues.

In one embodiment, a scheduling module and a feedback module may reside in the same physical device. For example, scheduling module 113 and feedback module 119 may reside on the same computing device, same network communication device (e.g., same network switch or same network router, and/or same network interface card (which may be inserted into the physical device). In another embodiment, a scheduling module and a feedback module may reside on different physical devices. For example, scheduling module 113 and feedback module 119 may reside on different computing devices, different network communication devices (e.g., different network switches or different network routers, and/or different network interface cards (which may be inserted into the same physical device).

Figure 1B:
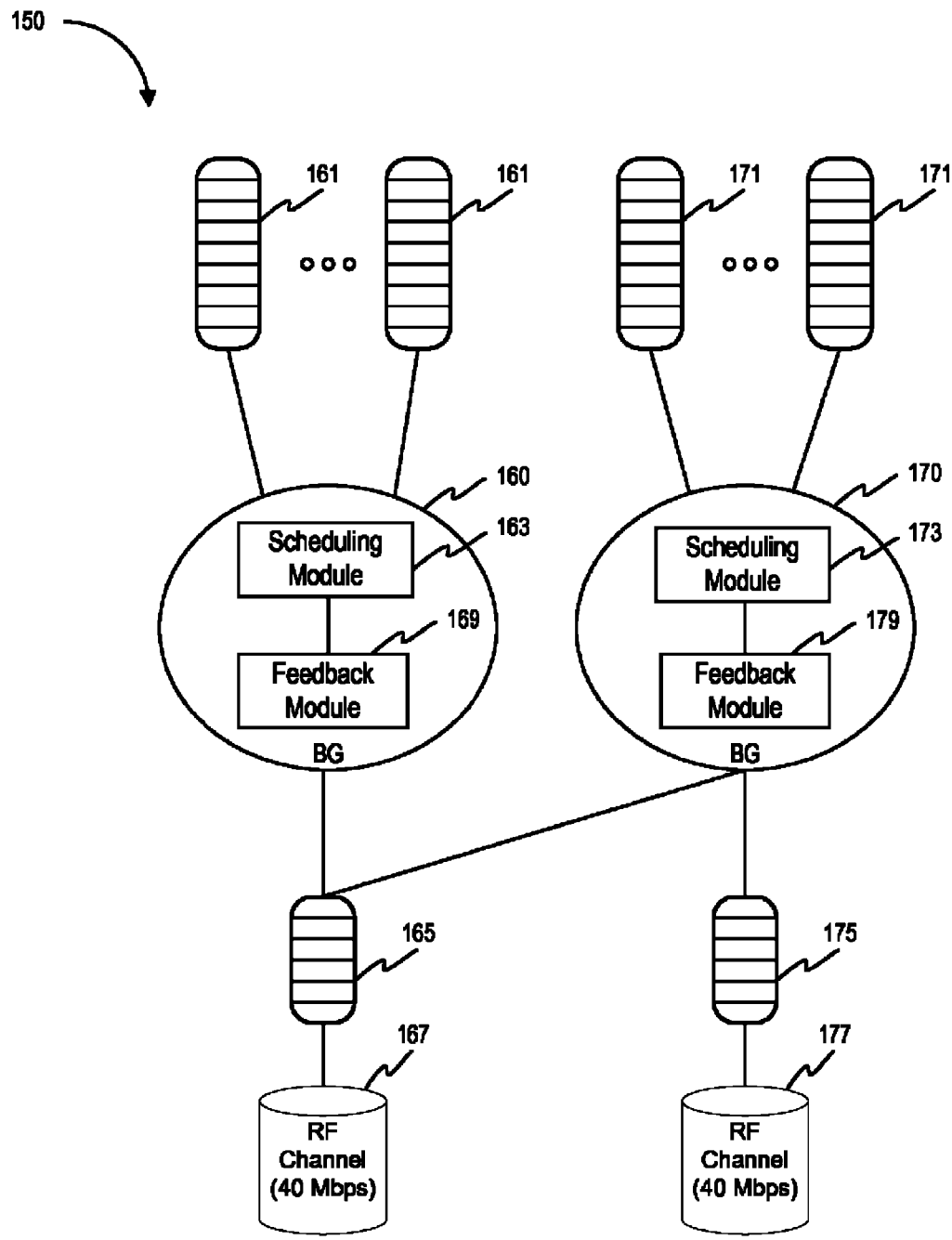
FIG. 1B is a block diagram illustrating an example network, in accordance with other embodiments.

FIG. 1B is a block diagram illustrating an example network 150, in accordance with other embodiments. The network 150 includes data queues 161, data queues 171, bonding group 160, bonding group 170, channel queue 165, channel queue 175, RF channel 167, and RF channel 177. As discussed above, the network 150 may use DOCSIS bonding groups to transmit downstream data from the data queues 161 and 171 to the RF channels 167 and 177. Bonding group 160 is associated with RF channel 167. Bonding group 170 is associated with RF channel 167 and RF channel 177. Bonding group 160 may transmit downstream data to channel queue 165. Bonding group 170 may transmit downstream data to channel queues 165 and 175.

As illustrated in FIG. 1B, the bonding group 160 includes a scheduling module 163 and a feedback module 169, and the bonding group 170 includes a scheduling module 173 and a feedback module 179. Referring back to FIG. 1A, the network 150 does not include separate nodes that receive data from the data queues 161 and 171 (as illustrated in FIG. 1A). Instead, the scheduling modules 163 and 173 (e.g., the L1 nodes) are part of the bonding groups 160 and 170 (e.g., are included in the L2 nodes), respectively. For example, the scheduling module 163 and the feedback module 169 may be different line cards that are in a networking switch and/or networking router.

Figure 2:
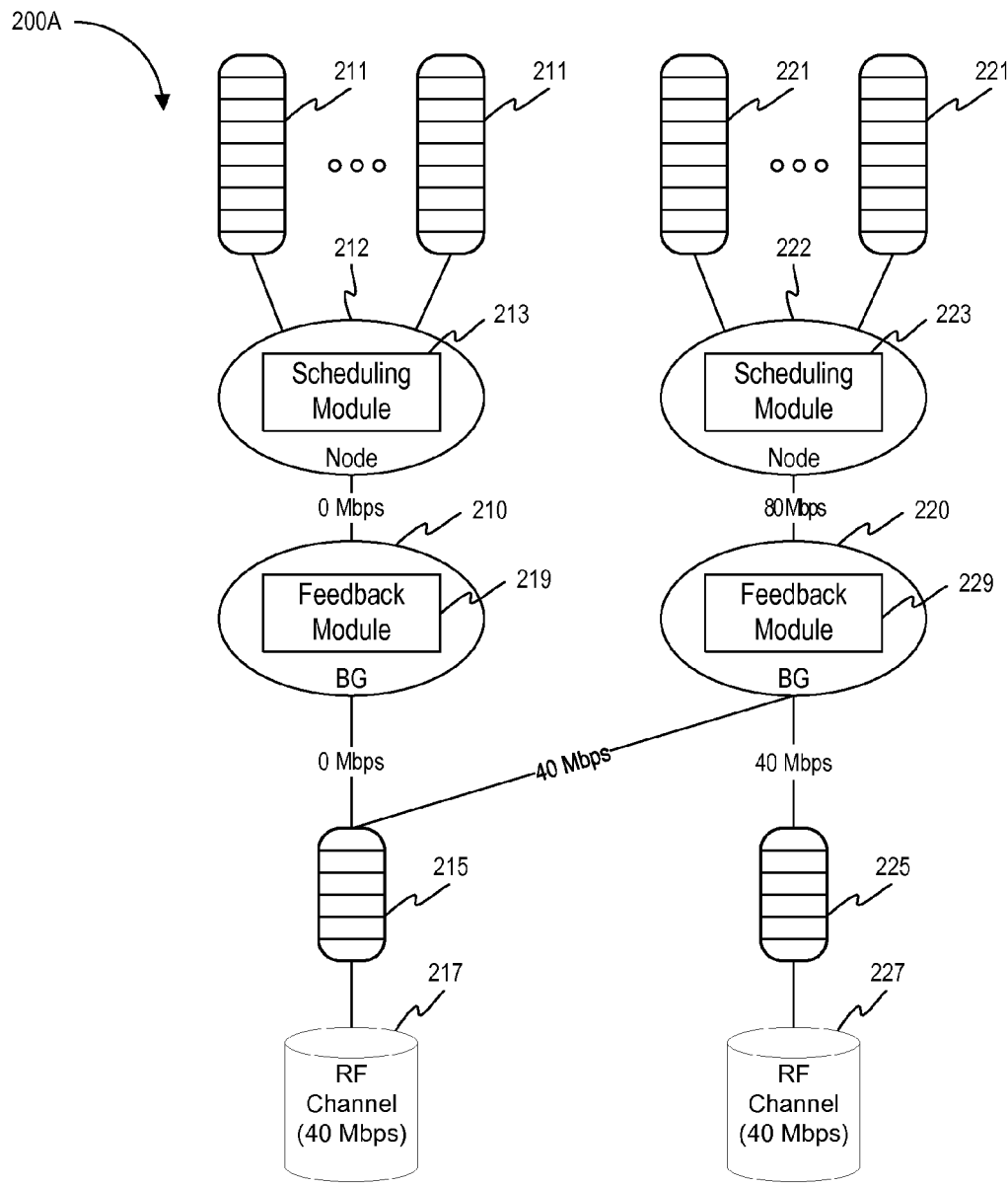
FIG. 2 is a block diagram illustrating an example network, in accordance with additional embodiments.

FIG. 2 is a block diagram illustrating an example network system 200A, in accordance with additional embodiments. The network 200A includes data queues 211, data queues 221, node 212, node 222, bonding group 210, bonding group 220, channel queue 215, channel queue 225, RF channel 217, and RF channel 227. Node 212 includes a scheduling module 213 and node 222 includes a scheduling module 223. Bonding group 210 includes feedback module 219 and bonding group 220 includes feedback module 229. As discussed above, the network 200A may use DOCSIS bonding groups to transmit downstream data from the data queues 211 and 221 to the RF channels 217 and 227. Bonding group 210 is associated with RF channel 217. Bonding group 220 is associated with RF channel 217 and RF channel 227. Node 212 is associated with bonding group 210 and may transmit downstream data from the data queues 211 to the bonding group 210. Bonding group 210 may transmit downstream data to channel queue 215. Node 222 is associated with bonding group 220 and may transmit downstream data from the data queues 221 to the bonding group 220. Bonding group 220 may transmit downstream data to channel queues 215 and 225. Bonding group 210 is configured to support a guaranteed (e.g., minimum) data rate of 30 megabits/second (Mbps) and a maximum data rate of 40 megabits/second. Bonding group 220 is configured to support a guaranteed (e.g., minimum) data rate of 50 megabits/second (Mbps) and a maximum data rate of 80 megabits/second.

The node 212 includes scheduling module 213 and the node 222 includes scheduling module 223. Scheduling module 213 may schedule the transmission of downstream data (e.g., digital data, binary data, packets, messages, etc.) in the data queues 211 to bonding group 210. Scheduling module 223 may schedule the transmission of downstream data in the data queues 221 to bonding group 220. In one embodiment, the scheduling modules 213 and 223 may not be aware of the underlying mesh topology/hierarchy of the bonding groups 210 and 220, and the RF channels 217 and 227. The scheduling modules 213 and 223 may modify the data rate of the downstream data to the bonding groups 210 and 220 based on feedback messages (as discussed above).

In one embodiment, the feedback modules 219 and 229 may schedule the transmission of downstream data received from respective nodes 212 and 222 by adding the downstream data into the channel queues of RF channels associated with the bonding groups 210 and 220, respectively. The feedback modules 219 and 229 may identify the RF channels that are associated with the respective bonding groups 210 and 220. The feedback modules 219 and 229 may also determine the data usage of the bonding groups 210 and 220 respectively (e.g., using token buckets). The feedback modules 219 and 229 may further determine whether the length of one or more channel queues of RF channels associated with their respective bonding groups 210 and 220 are greater than a threshold length. In another embodiment, separate modules, components, and/or schedulers (not shown in the figures) within the bonding groups 210 and 220 may schedule the transmission of downstream data received from respective nodes 212 and 222 by adding the downstream data into the channel queues of RF channels associated with the bonding groups 210 and 220, respectively (as discussed above). In one embodiment, the feedback modules 219 and 229 may cause the scheduling modules 213 and 223 to modify the data rate of the downstream data transmitted to the bonding groups 210 and 220 based on the data usage of the bonding groups 210 and 220, and based on the channel queues 215 and 225. Feedback modules 219 and 229 may cause the scheduling modules 213 and 223 to modify the data rate of the downstream data by transmitting feedback messages (not shown in FIG. 2). The feedback messages may indicate whether a scheduling module should decrease, stop, increase, and/or continue sending downstream data and/or types of downstream data.

As discussed above, the scheduling modules 213 and 223, the feedback messages, and the feedback modules may allow a bonding group to increase and/or maximize the data rates of downstream data when other bonding groups are not transmitting downstream data or are have less downstream data to transmit. As illustrated in FIG. 2, bonding group 210 has a received rate of 0 megabits/second. This may indicate that node 212 does not have downstream data to transmit to the bonding group 210. Bonding group 220 has a received rate of 80 megabits/second. This may indicate that node 222 has enough downstream data to transmit at a rate of 80 megabits a second to bonding group 220. Bonding group 220 has a maximum data rate of 80 megabits/second because the bonding group 220 is associated with RF channels 217 and 227. Although 30 megabits/second of the capacity of RF channel 217 may be used for bonding group 210 (e.g., may be allocated for bonding group 210), bonding group 210 has no downstream data to transmit. The bonding group 220 may use the portion of the capacity of the RF channel 217 that is not used by the bonding group 210 and may use the portion of the capacity of the RF channels 217 and 227 allocated to the bonding group 220 to transmit downstream data at a total data rate of 80 megabits/second. In one embodiment, the bonding group 220 may transmit feedback messages (not shown in the FIG. 2) to cause the node 222 to increase the rate of the downstream data from 50 megabits/second to 80 megabits/second. For example, the bonding group 220 may transmit a feedback message indicating that the node 222 should increase the rate of downstream data that may be transmitted to the bonding group 220.

Figure 3:
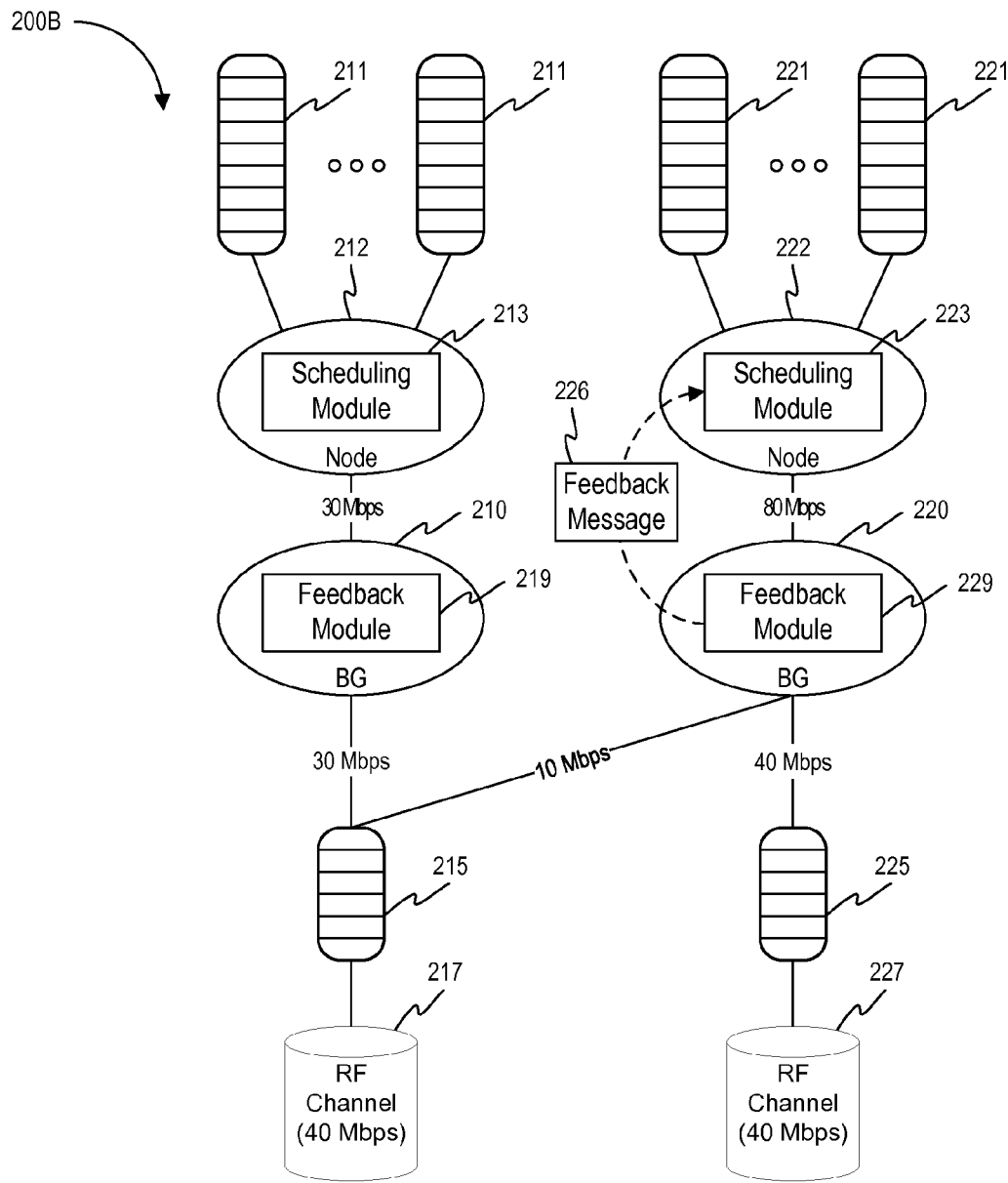
FIG. 3 is a block diagram illustrating an example network, in accordance with further embodiments.

FIG. 3 is a block diagram illustrating an example network system 200B, in accordance with further embodiments. As discussed above, the network 200B includes data queues 211, data queues 221, node 212, node 222, bonding group 210, bonding group 220, channel queue 215, channel queue 225, RF channel 217, and RF channel 227. Node 212 includes a scheduling module 213 and node 222 includes a scheduling module 223. The scheduling modules 213 and 223 may not be aware of the underlying mesh topology/hierarchy of the bonding groups 210 and 220, and the RF channels 217 and 227. Bonding group 210 includes feedback module 219 and bonding group 220 includes feedback module 229. As discussed above, the network 200B may use DOCSIS bonding groups to transmit downstream data from the data queues 211 and 221 to the RF channels 217 and 227. Bonding group 210 is associated with RF channel 217. Bonding group 220 is associated with RF channel 217 and RF channel 227. Node 212 is associated with bonding group 210 and may transmit downstream data from the data queues 211 to the bonding group 210. Bonding group 210 may transmit downstream data to channel queue 215. Node 222 is associated with bonding group 220 and may transmit downstream data from the data queues 221 to the bonding group 220. Bonding group 220 may transmit downstream data to channel queues 215 and 225. Bonding group 210 is configured to support a minimum data rate of 30 megabits/second (Mbps) and a maximum data rate of 40 megabits/second. Bonding group 220 is configured to support a minimum data rate of 50 megabits/second (Mbps) and a maximum data rate of 80 megabits/second.

Also as discussed above, the scheduling modules 213 and 223, the feedback messages, and the feedback modules 219 and 229 may allow a bonding group to increase and/or maximize the data rates of downstream data when other bonding groups are not transmitting downstream data or are have less downstream data to transmit. Referring to FIG. 2, the bonding group 220 may use the portion of the capacity of the RF channel 217 that is not used by the bonding group 210 and may use the portion of the capacity of the RF channels 217 and 227 allocated to the bonding group 220 to transmit downstream data at a total data rate of 80 megabits/second.

In one embodiment, the node 212 may receive downstream data from the data queues 211. The node 212 may transmit downstream data from the data queue 211 to the bonding group 210 and the bonding group 210 may transmit the downstream data to the RF channel 217 via the channel queue 215. As illustrated in FIG. 3, bonding group 210 has a received rate of 30 megabits/second and the bonding group 220 has a received rate of 80 megabits/second. Thus, the total amount of data to be transmitted (e.g., 30 megabits/second+80 megabits/second) may exceed the capacity of the RF channels 217 and 227 (e.g., 80 megabits/second).

The length of the channel queue 215 may increase past a threshold length because both the bonding groups 210 and 220 may be transmitting downstream data to the channel queue 215. The length of the channel queue 225 may increase because the bonding group 220 is no longer able to transmit at the maximum data rate of 80 megabits/second (as illustrated and discussed above in conjunction with FIG. 2) and the additional downstream data may increase the length of the channel queue 225. The feedback module 229 may determine that the lengths of the channel queues 215 and 225 are greater than a threshold length. The feedback module 229 may also determine that the data usage of the bonding group 220 is greater than the minimum data rate of the bonding group. For example, referring back to FIG. 2, the feedback module 229 may determine that the data usage (e.g., data rate) of 80 megabits/second is greater than the minimum data rate of 50 megabits/second. The feedback module 229 may transmit feedback message 226 to the node 222 to indicate that the node 222 should decrease and/or stop transmitting data. The node 222 may reduce the amount of downstream data and/or reduce the data rate of the downstream data to 50 megabits/second (e.g., to the minimum data rate for the bonding group 220).

Figure 4:
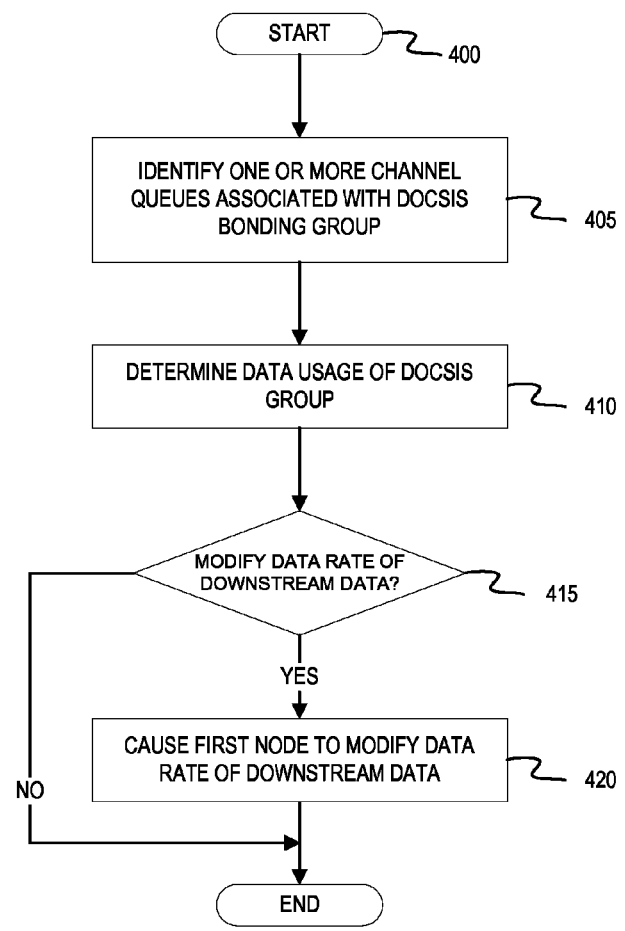
FIG. 4 is a flowchart representation of a method of scheduling the transmission of downstream data in a network, in accordance with some embodiments.

FIG. 4 is a flowchart representation of a method 400 of scheduling the transmission of downstream data in a network, in accordance with some embodiments. The method 400 may be performed by processing logic that comprises hardware (e.g., circuitry, dedicated logic, programmable logic, microcode, etc.), software (e.g., instructions run on a processor to perform hardware simulation), or a combination thereof. In some implementations, the method 400 may be performed by a feedback module (as illustrated in FIGS. 1, 2, and 3) and/or a computing device (e.g., a computing device). Briefly, method 400 includes identifying one or more channel queues, determining a data usage of a DOCSIS bonding group, and causing a first node to modify a data rate of downstream data based on the data usages and the length of the one or more channel queues.

The method begins at block 405 where the method 400 identifies one or more RF channels associated with a DOCSIS bonding group. For example, referring to FIG. 1A, the method 400 may identify and/or determine that RF channels 117, 127, and 137 are associated with bonding group 130 (e.g., a DOCSIS bonding group). The method 400 determines the data usage of the DOCSIS bonding group at block 410. For example, the method 400 may use a token bucket associated with the DOCSIS bonding group to determine the data usage of the DOCSIS bonding group (e.g., the data rate and/or the amount of downstream data transmitted by the DOCSIS bonding group).

At block 415, the method 400 may determine whether to cause a first node associated with the DOCSIS bonding group to modify the data rate of the downstream data received from the first node. In one embodiment, the method 400 may determine whether the lengths of one or more (or all) of the channel queues associated with the DOCSIS bonding group are greater than a threshold length and may also determine whether the data usage of the DOCSIS bonding group is greater than a minimum data rate (as discussed above in conjunction with FIGS. 1 through 3). If the method 400 determines that the data rate of the downstream data should be modified, the method 400 may proceed to block 420. For example, the method 400 may determine that all of the channel queues associated with the DOCSIS bonding group are greater than the threshold length and that the data usage of the DOCSIS bonding group is greater than the minimum data rate (as discussed above in conjunction with FIGS. 1 through 3). At block 420, the method 400 may cause the first node to modify the data rate of the downstream data. For example, the method 400 may send a feedback message to the first node indicating that the first node should increase/decrease the amount of downstream data and/or resume/stop sending downstream data (as discussed above in conjunction with FIGS. 1 through 3). Referring to block 415, if the method 400 determines that the data rate of the downstream data should not be modified, the method 400 ends. For example, the method 400 may determine that one or more of the channel queues associated with the DOCSIS bonding group are less than (or equal to) the threshold length or that the data usage of the DOCSIS bonding group is less than (or equal to) the minimum data rate (as discussed above in conjunction with FIGS. 1 through 3).

Figure 5:
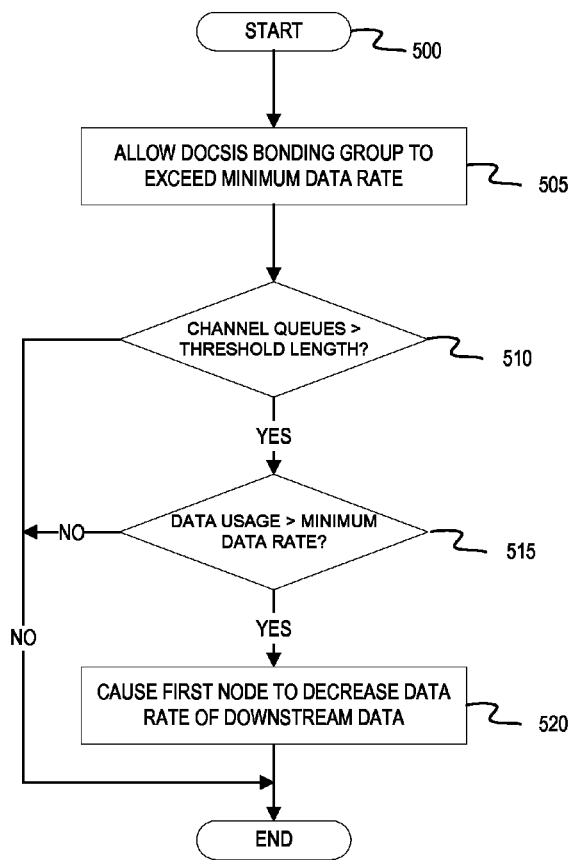
FIG. 5 is a flowchart representation of a method of scheduling the transmission of downstream data in a network, in accordance with additional embodiments.

FIG. 5 is a flowchart representation of a method 500 of scheduling the transmission of downstream data in a network, in accordance with additional embodiments. The method 500 may be performed by processing logic that comprises hardware (e.g., circuitry, dedicated logic, programmable logic, microcode, etc.), software (e.g., instructions run on a processor to perform hardware simulation), or a combination thereof. In some implementations, the method 500 may be performed by one or more of a feedback modules (as illustrated in FIGS. 1, 2, and 3) and/or a computing device (e.g., a server computing device). Briefly, method 500 includes allowing a DOCSIS bonding group to exceed a minimum data rate, determining a data usage of the DOCSIS bonding group, and causing a first node to decrease a data rate of downstream data based on the data usage and the length of the one or more channel queues.

The method begins at block 505 where the method 500 allows the DOCSIS bonding group to exceed the minimum data rate for the DOCSIS bonding group. For example, the DOCSIS bonding group may transmit downstream data at a data rate greater than the minimum data rate for the DOCSIS bonding group because other DOCSIS bonding groups may not be using one or more of the RF channels associated with the DOCSIS bonding group (as discussed above in conjunction with FIGS. 1, 2, and 3). At block 510, the method 500 determines whether the lengths of one or more channels queues are greater than a threshold length. If the lengths of one or more (or all) channels queues is not greater than the threshold length, the method 500 ends. If the lengths of one or more (or all) channels queues are greater than the threshold length, the method 500 proceeds to block 515 where the method 500 determines the data usage of the DOCSIS bonding group at block 515. For example, the method 500 may use a token bucket associated with the DOCSIS bonding group to determine the data usage of the DOCSIS bonding group (e.g., the data rate and/or the amount of downstream data transmitted by the DOCSIS bonding group). If the data usage of the DOCSIS bonding group is not greater than the minimum data rate, the method 500 ends. If the data usage of the DOCSIS bonding group is greater than the minimum data rate, the method 500 proceeds to block 520 where the method 500 may cause the first node to modify the data rate of the downstream data. For example, the method 500 may send a feedback message to the first node indicating that the first node should decrease the amount of downstream data and/or stop sending downstream data (as discussed above in conjunction with FIGS. 1 through 3).

Figure 6:
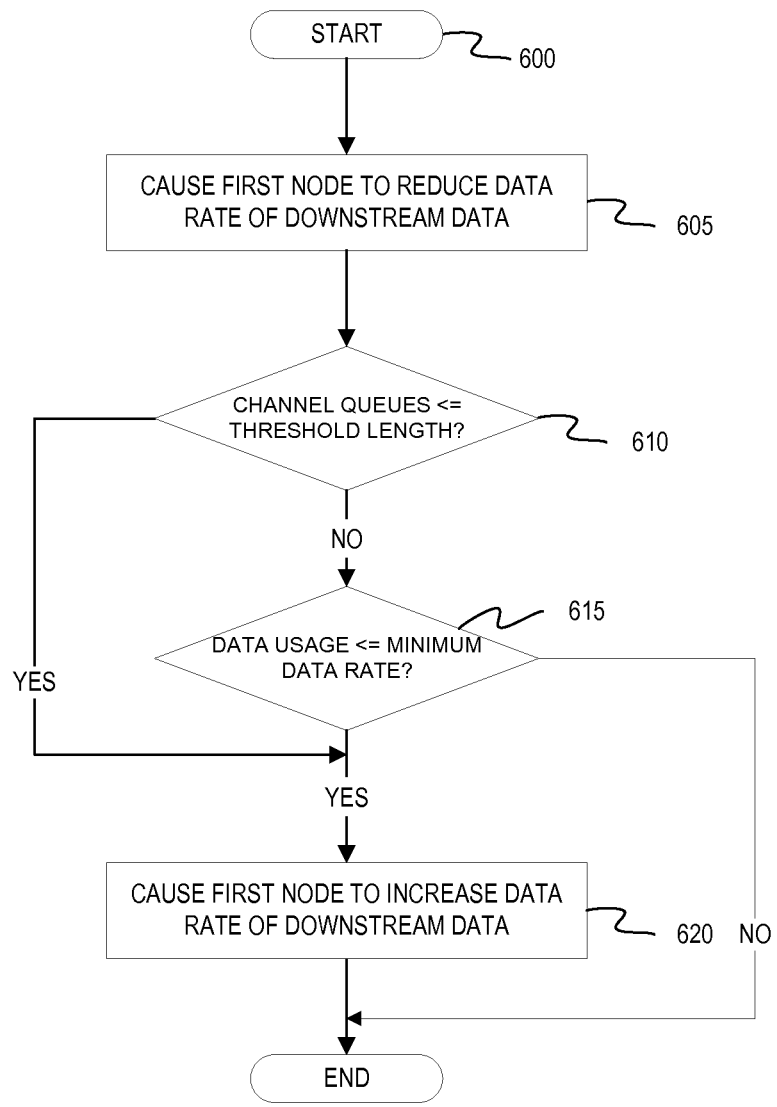
FIG. 6 is a flowchart representation of a method of scheduling the transmission of downstream data in a network, in accordance with further embodiments.

FIG. 6 is a flowchart representation of a method 600 of scheduling the transmission of downstream data in a network, in accordance with further embodiments. The method 600 may be performed by processing logic that comprises hardware (e.g., circuitry, dedicated logic, programmable logic, microcode, etc.), software (e.g., instructions run on a processor to perform hardware simulation), or a combination thereof. In some implementations, the method 600 may be performed by one or more of a feedback modules (as illustrated in FIGS. 1, 2, and 3) and/or a computing device (e.g., a server computing device). Briefly, method 600 includes causing a first node to reduce the data rate of downstream data, determining a data usage of the DOCSIS bonding group, and causing a first node to increase the data rate of the downstream data based on the data usage and the length of the one or more channel queues.

The method begins at block 605 where the method 600 causes a first node to decrease a data rate of downstream data transmitted to the DOCSIS bonding group. For example, the DOCSIS bonding group may transmit downstream data at the minimum data rate for the DOCSIS bonding group because other DOCSIS bonding groups are also using one or more of the RF channels associated with the DOCSIS bonding group (as discussed above in conjunction with FIGS. 1, 2, and 3). At block 620, the method 600 determines whether the lengths of one or more (or all) channels queues is less than or equal to a threshold length. If the lengths of one or more (or all) channels queues is less than or equal to the threshold length, the method 600 proceeds to block 620 where the method 600 may cause the first node to increase the data rate of downstream data. For example, the method 600 may send a feedback message to the first node indicating that the first node should increase the amount of downstream data and/or continue sending downstream data (as discussed above in conjunction with FIGS. 1 through 3). If the lengths of one or more (or all) channels queues is not less than or equal to the threshold length, the method 600 proceeds to block 615 where the method 600 determines whether the data usage of the DOCSIS bonding group is less than or equal to the minimum data rate for the DOCSIS bonding group. For example, the method 600 may use a token bucket associated with the DOCSIS bonding group to determine the data usage of the DOCSIS bonding group (e.g., the data rate and/or the amount of downstream data transmitted by the DOCSIS bonding group). If the data usage of the DOCSIS bonding group is less than or equal to the minimum data rate, the method 600 proceeds to block 620 where the method 600 may cause the first node to increase the data rate of downstream data. If the data usage of the DOCSIS bonding group is not less than or equal to the minimum data rate, the method 600 ends.

Figure 7:
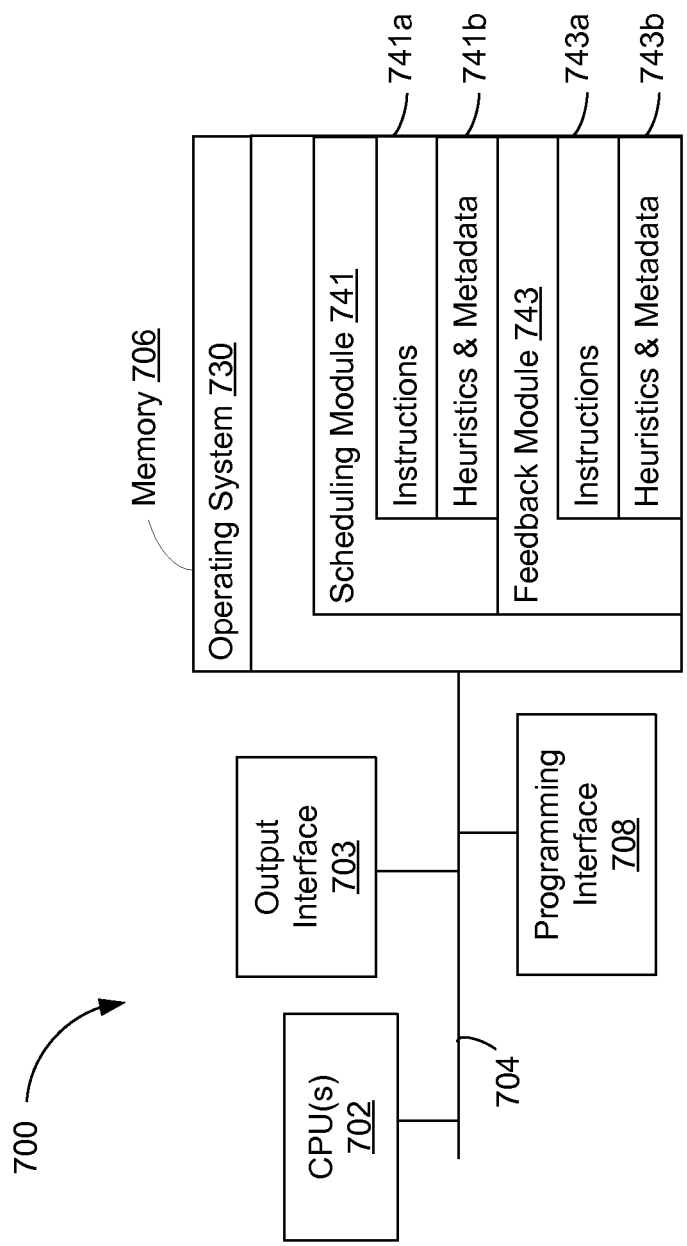
FIG. 7 is a block diagram of a computing device, in accordance with some embodiments.

FIG. 7 is a block diagram of the computing device 700 in accordance with some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the computing device 700 includes one or more processing units (CPU's) 702 (e.g., processors), one or more output interfaces 703, a memory 706, a programming interface 708, and one or more communication buses 704 for interconnecting these and various other components.

In some embodiments, the communication buses 704 include circuitry that interconnects and controls communications between system components. The memory 706 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 706 optionally includes one or more storage devices remotely located from the CPU(s) 702. The memory 706 comprises a non-transitory computer readable storage medium. Moreover, in some embodiments, the memory 706 or the non-transitory computer readable storage medium of the memory 706 stores the following programs, modules and data structures, or a subset thereof including an optional operating system 730 and a media relay service module 740. In some embodiment, one or more instructions are included in a combination of logic and non-transitory memory. The operating system 730 includes procedures for handling various basic system services and for performing hardware dependent tasks.

In some embodiments, the scheduling module 741 is configured to schedule the transmission of downstream data to a bonding group, to receive feedback messages, and to modify the data rate of the downstream data based on the feedback messages (as discussed above in conjunction with FIGS. 1 through 6). To that end, in some embodiments, the scheduling module 741 includes a set of instructions 741*a* and heuristics and metadata 741*b*. In some embodiments, the feedback module 743 is configured to determine the data usage of a bonding group, determine the lengths of one or more channels queues of one or more RF channels associated with the bonding group, and to cause a node to modify the data rate of downstream data transmitted to the bonding group (as discussed above in conjunction with FIGS. 1 through 6). To that end, in some embodiments, the feedback module 743 includes a set of instructions 743*a* and heuristics and metadata 743*b*.

Although the scheduling module 741 and feedback module 743 are illustrated as residing on a single computing device, it should be understood that in other embodiments, the scheduling module 741 and feedback module 743 may reside on separate computing devices. For example, the scheduling module 741 may reside on a first computing device and the feedback module 743 may reside on a second computing device.

Moreover, FIG. 7 is intended more as functional description of the various features which may be present in a particular embodiment as opposed to a structural schematic of the embodiments described herein. As recognized by those of ordinary skill in the art, items shown separately could be combined and some items could be separated. For example, some functional modules shown separately in FIG. 7 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software and/or firmware chosen for a particular embodiment.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional subcomponents to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some aspects of the systems and methods described herein can advantageously be implemented using, for example, computer software, hardware, firmware, or any combination of computer software, hardware, and firmware. Computer software can comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that can be implemented using software to be executed on a general purpose computer can also be implemented using a different combination of hardware, software, or firmware. For example, such a module can be implemented completely in hardware using a combination of integrated circuits. Alternatively or additionally, such a feature or function can be implemented completely or partially using specialized computers designed to perform the particular functions described herein rather than by general purpose computers.

Multiple distributed computing devices can be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that can direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact. Also as used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

Further as used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method comprising:
    identifying one or more channel queues associated with one or more RF channels, wherein the one or more RF channels are associated with a Data Over Cable System Interface Specification (DOCSIS) bonding group and wherein the DOCSIS bonding group receives downstream data from a first node;
    determining one or more respective lengths of the one or more channel queues;
    determining a data throughput of the DOCSIS bonding group;
    in response to determining that all of the respective lengths are greater than a length threshold and the data throughput is greater than a throughput threshold, causing the first node to decrease the data rate of the downstream data; and
    in response to determining that at least one of the respective lengths is less than the length threshold or the data throughput is less than the throughput threshold, causing the first node to increase the data rate of the downstream data.

2. The method of claim 1, wherein determining the data throughput of the DOCSIS bonding group comprises:

determining the data throughput of the DOCSIS bonding group based on a token bucket associated with the DOCSIS bonding group.

3. The method of claim 1, wherein causing the first node to decrease the data rate comprises:
sending a feedback message to the first node, the feedback message comprising data indicating that the data rate of the downstream data is to be decreased.

4. The method of claim 1, wherein causing the first node to decrease the data rate comprises:
sending a feedback message to the first node, the feedback message comprising data indicating that a data rate of one or more types of downstream data is to be decreased.

5. The method of claim 1, wherein causing the first node to increase the data rate of the downstream data comprises:
sending a feedback message to the first node, the feedback message comprising data indicating that the data rate of the downstream data is to be increased.

6. The method of claim 1, wherein the data throughput of the DOCSIS bonding group is greater than a minimum data rate for the DOCSIS bonding group.

7. The method of claim 1, wherein a first RF channel from the one or more RF channels is associated with a second DOCSIS bonding group.

8. The method of claim 1, wherein the first node comprises a scheduling module configured to schedule the downstream data to the DOCSIS bonding group.

9. The method of claim 8, wherein the scheduling module is further configured to receive a feedback message and modify the data rate of the downstream data based on the feedback messages.

10. A system, comprising:
a memory; and
a processor coupled to the memory, at least one of the processor or the memory being configured to:
identify one or more channel queues associated with one or more RF channels, wherein the one or more RF channels are associated with a Data Over Cable System Interface Specification (DOCSIS) bonding group and wherein the DOCSIS bonding group receives downstream data from a first node;
determine one or more respective lengths of the one or more channel queues;
determine a data throughput of the DOCSIS bonding group;
in response to determining that all of the respective lengths are greater than a length threshold and the data throughput is greater than a throughput threshold, causing the first node to decrease the data rate of the downstream data; and
in response to determining that at least one of the respective lengths is less than the length threshold or the data throughput is less than the throughput threshold, causing the first node to increase the data rate of the downstream data.

11. The system of claim 10, wherein at least one of the processor or the memory is configured to determine the data throughput of the DOCSIS bonding group based on a token bucket associated with the DOCSIS bonding group.

12. The system of claim 10, wherein at least one of the processor or the memory is configured to cause the first node to decrease the data rate by:
sending a feedback message to the first node, the feedback message comprising data indicating that the data rate of the downstream data is to be decreased.

13. The system of claim 10, wherein at least one of the processor or the memory is configured to cause first node to decrease the data rate by:
sending a feedback message to the first node, the feedback message comprising data indicating that a data rate of one or more types of downstream data is to be decreased.

14. The system of claim 10, wherein at least one of the processor and or the memory is configured to cause first node to increase the data rate of the downstream data by:
sending a feedback message to the first node, the feedback message comprising data indicating that the data rate of the downstream data be increased.

15. The system of claim 10, wherein the data throughput of the DOCSIS bonding group is greater than a minimum data rate for the DOCSIS bonding group.

16. The system of claim 10, further comprising:
the first node, wherein the first node comprises a scheduling module and wherein the scheduling module is configured to receive a feedback message and modify the data rate of the downstream data based on the feedback message.

* * * * *